United States Patent
Luszczak et al.

(10) Patent No.: US 9,449,046 B1
(45) Date of Patent: Sep. 20, 2016

(54) CONSTANT-VECTOR COMPUTATION SYSTEM AND METHOD THAT EXPLOITS CONSTANT-VALUE SEQUENCES DURING DATA PROCESSING

(75) Inventors: Alicja Luszczak, Amsterdam (NL); Marcin Zukowski, Amsterdam (NL); Peter Boncz, Amsterdam (NL)

(73) Assignee: ACTIAN NETHERLANDS B.V., Amsterdam (NL)

( * ) Notice: Subject to any disclaimer, the term of this patent is extended or adjusted under 35 U.S.C. 154(b) by 359 days.

(21) Appl. No.: 13/563,460

(22) Filed: Jul. 31, 2012

(51) Int. Cl.
*G06F 17/30* (2006.01)
*G06F 7/00* (2006.01)

(52) U.S. Cl.
CPC .................. *G06F 17/30474* (2013.01)

(58) Field of Classification Search
CPC ........... G06F 17/30389; G06F 17/30442; G06F 17/30474; G06F 17/30315
See application file for complete search history.

(56) References Cited

U.S. PATENT DOCUMENTS

| | | | |
|---|---|---|---|
| 8,626,725 B2 * | 1/2014 | Netz et al. | 707/693 |
| 9,110,946 B2 * | 8/2015 | Chen | G06F 17/30442 |
| 9,171,041 B1 * | 10/2015 | Narayanan | G06F 17/30442 |

OTHER PUBLICATIONS

Abadi et al., Integrating Compression and Execution in Column-Oriented Database Systems, SIGMOD 2006,. published 2006, pp. 671-682.*
Alicja Luszczak, *Simple Solutions for Compressed Execution in Vectorized Database System*. MSc thesis, University of Warsaw, 2011 (70 pgs.).
Daniel J. Abadi, Samuel Madden, and Miguel Ferreira. Integrating compression and execution in column-oriented database systems. In *Proceedings of the 2006 ACM SIGMOD international conference on Management of data*, 2006 (12 pgs.).

* cited by examiner

*Primary Examiner* — Jeffrey A Burke
(74) *Attorney, Agent, or Firm* — DLA Piper LLP (US)

(57) ABSTRACT

A constant-vector computation system and method are provided that exploit constant-value blocks during data processing in a database. The system and method may be implemented in any data processing system that processes data at a vector or block granularity.

41 Claims, 7 Drawing Sheets

| Query no. | 0 | 1 | 2 | 3 | 4 | 5 | 6 | 7 | 8 | 9 |
|---|---|---|---|---|---|---|---|---|---|---|
| Exec. time change | -40.7% | -10.6% | 2.6% | +0.6% | -4.5% | -26.0% | -20.7% | -18.1% | +4.0% | -53.9% |
| Estimate | -79.5% | -33.9% | -14.6% | -6.8% | -27.3% | -48.0% | -43.5% | -38.5% | -3.3% | -85.5% |

FIGURE 6

CONSTANT-VECTOR COMPUTATION SYSTEM AND METHOD THAT EXPLOITS CONSTANT-VALUE SEQUENCES DURING DATA PROCESSING

FIELD

The disclosure relates generally to a database management system and in particular to a database management system that processes data at a block granularity.

BACKGROUND

Data compression, commonly used in database systems provides multiple benefits, including reduced disk and memory requirements and reduced data transfer bandwidth. It also highlights properties of data that can be used to execute queries more efficiently by processing compressed data without de-compressing it. Different solutions for such compressed execution have been proposed but most focused on different forms of data encoding, reducing processing time for individual records. As such, they did not exploit opportunities provided by databases that work on multiple records in one processing stage by processing data on a vector or block granularity as discussed in Marcin Zukowski. *Balancing Vectorized Query Execution with Bandwidth-Optimized Storage*. PhD thesis, Universiteit van Amsterdam, 2009 (hereinafter "Zuk09".) The only well-known method that operates on multiple compressed records with identical values at the same time is described in an article by Daniel J. Abadi, Samuel Madden, and Miguel Ferreira, "Integrating Compression and Execution in Column-Oriented Database Systems" in *Proceedings of the 2006 ACM SIGMOD international conference on Management of data,* 2006. This article focused on processing data that was compressed with many different techniques. The article described the use of special objects representing a portion of compressed data (for example, in case of run-length encoding—a single run, that is, a sequence of identical consecutive values, in case of dictionary compression—a single encoded value and dictionary handle). The article then described re-implementing the database kernel so that it would use methods of these objects instead of accessing raw data. One of the compression methods used was run-length encoding (RLE), which—in some situations—allowed operating on the entire run of consecutive identical values at the same time.

The solution proposed by Abadi was mostly intended for systems that process data tuple-at-a-time. In order to process RLE-compressed data in a similar fashion in a vector-at-a-time system, the system would need to represent data in vectors as collections of runs of RLE-compressed data. The conversion of all of the operators to work on such collections would be highly cumbersome and require major adaptation of the database engine. Moreover, in case of RLE-compressed data, the solution of Abadi et al. can be inefficient for short runs because the per-run overhead would be amortized over a small number of tuples, significantly increasing the per-record cost (compared to operating directly on "raw" data), and there is little opportunity for performance improvement. Hence, if RLE-compressed data has a large variation in run lengths, then any speedup of the processing achieved for long runs might be hindered by slowdown for short runs. These overheads are especially visible in block-oriented processing systems (where most of other per-record overheads are eliminated). This means that the overheads of RLE-compressed execution might reduce or eliminate the benefits of block- or vector-oriented processing.

Thus, it is desirable to provide a system and method that allows exploitation of identical-value runs, like in RLE-compression, without incurring a significant processing overhead during data processing and it is to this end that the disclosure is directed.

BRIEF DESCRIPTION OF THE DRAWINGS

FIG. 6 is a chart with example benchmark results for the constant vector computing method and system.

DETAILED DESCRIPTION OF ONE OR MORE EMBODIMENTS

The disclosure is particularly applicable to a constant vector computation system and method in a vectorized database system, such as the Vectorwise product by the Actian Corporation and it is in this context that the disclosure will be described. It will be appreciated, however, that the system and method has greater utility since it can be used with other data access systems in which the constant vector computation provides the advantages described below, including any other systems that process data on a vector or block granularity.

One aspect of the system is that the system improves performance of a database management system by achieving shorter query execution times by exploiting properties of data that are exposed by compression techniques commonly used in database systems. In particular, the system exploits streams of multiple tuples with identical values of a certain attribute that are clustered together in the data stream. In more detail, the system and method identify vectors or blocks of data that contain identical values during decompression and processing and mark them with a special flag that can later be used to choose the most efficient way of operating on the data. The system and method is also easy to integrate with an existing database operating at a vector or block granularity so that the system does not involve the redesign or any major changes of an existing query execution engine. The system and method also allows the reuse of code (with primitives/operators) that is already a part of a vector-at-a-time database system, rather than introducing new compression-specific code so that performance benefits are achieved with only cosmetic and incremental changes to a database kernel—as opposed to previously proposed solutions that required invasive modifications. Now, an example of a database system that may implement the constant vector computation is described.

Figure 1:
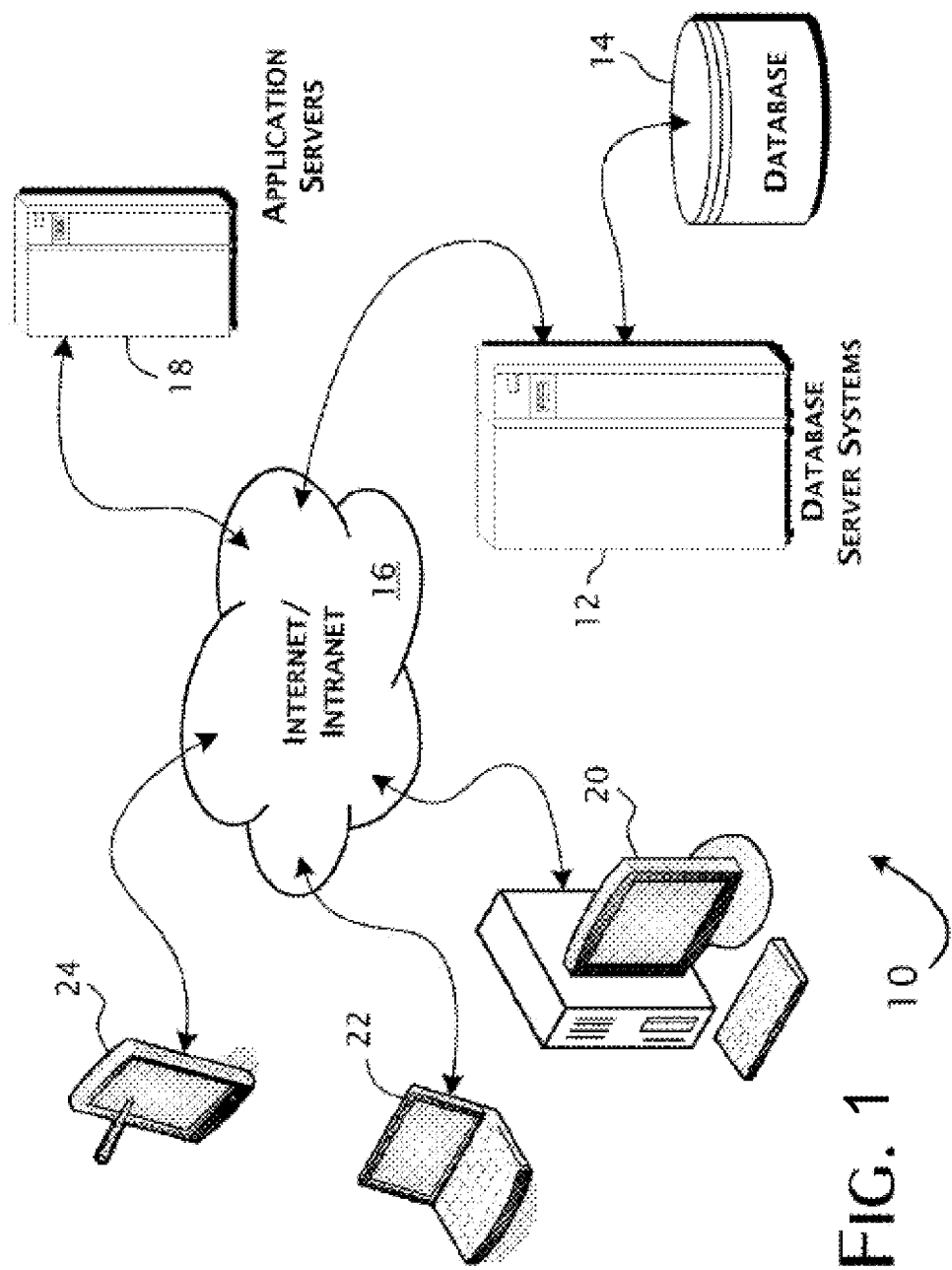
FIG. 1 is a diagram illustrating an implementation of an operating environment of a database system.

FIG. 1 is a system diagram illustrating an implementation of an operating environment 10 of a database system. In the environment, one or more database server systems 12 host, directly or indirectly, a storage device 14, such as, for example, a database. Access requests are typically received over a wired or wireless link 16, such as for example, the Internet and intranet or other networks, from various sources such as for example one or more application servers 18 that are each executing on-line transaction processing (OLTP) applications. The specific operations of the OLTP applications are typically directed by or executed in support of requests from one or more computing units, such as for example, client applications executed on client computers 20 of various types including mobile computers 22 and communications devices 24. Each computing unit may be a processing unit based device with sufficient processing power, memory and connectivity to interact with the database server system 12. For example, each computing device may be a smartphone (Apple iPhone, RIM Blackberry, Android based devices), a personal computer, a tablet computer and the like.

Figure 2:
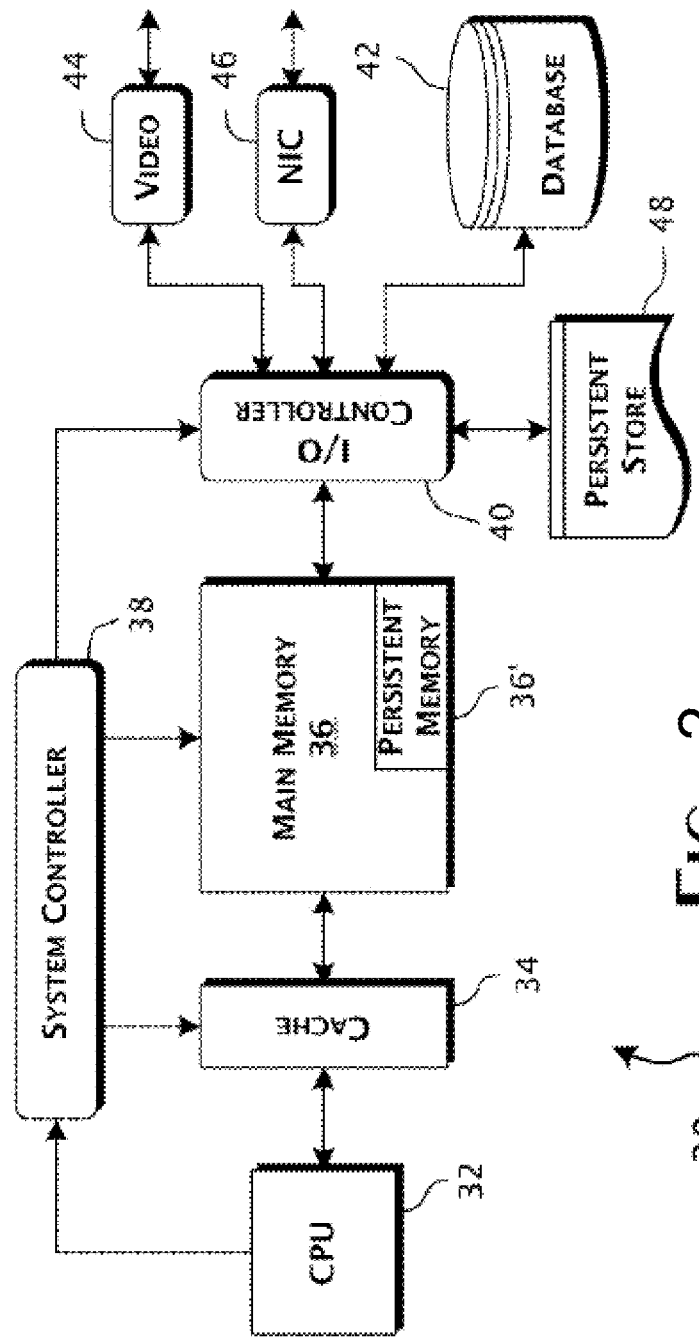
FIG. 2 is a simplified block diagram of an implementation of a computer database system for the database system that may implement a constant vector computation process.

FIG. 2 is a simplified block diagram of an implementation of a computer database system 30 for the database system 12 that may implement a constant vector computation process. The database system 30 may include one or more central processing unit (CPU) subsystem 32, implemented for example as a multi-core, multiprocessor subsystem, includes some combination of in-core and close coupled cache subsystem 34 connected to a main memory store 36. In typical embodiments, the cache subsystem 34 will range from 2 to 32 megabytes per core with typically additional, larger cache layers shared among the cores within the CPU subsystem 32 and the main memory 36 will be substantially larger. A portion 36' of the main memory store 36 may be implemented to be persistent memory so that the data is maintained even when power is removed, such as by using Flash memory or a conventional backup battery solution. A system controller 38 manages data transfers between the central processing subsystem 32, cache 34, and main memory 36 subsystems through one or more input/output (I/O) controllers 40 that connect, directly or indirectly, to a physical database 42, and I/O devices, including typically a video controller 44 and network interface controller 46. A high-access rate persistent store 48, utilizing a high-performance magnetic or Flash emulation disk, may also be provided.

Figure 3:
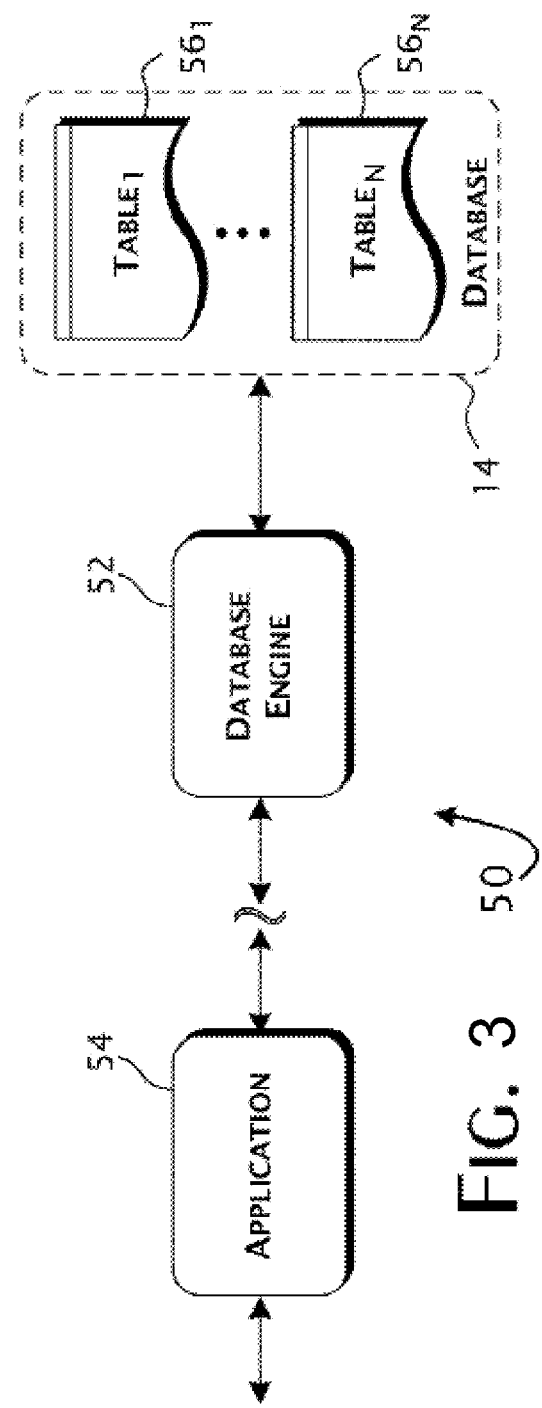
FIG. 3 is a block diagram illustrating a tiered implementation of the database system execution environment that is implemented in or as part of a database engine.

FIG. 3 is a block diagram illustrating a preferred tiered implementation of the database system execution environment 50 that is implemented in or as part of a database engine 52. Database read and update requests are received from one or more applications 54 and satisfied by access to a database 14 containing one or more data tables, such as $56_1, \ldots, 56_N$ as shown in FIG. 3. The one or more applications 54 may be executed local or remote with respect to the database engine 52. The database 14 may be implemented as a physical storage device 42 connected directly to a database server system 12 that executes the database engine 52 or remotely through storage area network (SAN) or other distributed data storage system. The above database system, including the database engine 52, may implement a constant vector computation process for a data access system, such as, for example, a vectorized database system.

Figure 4:
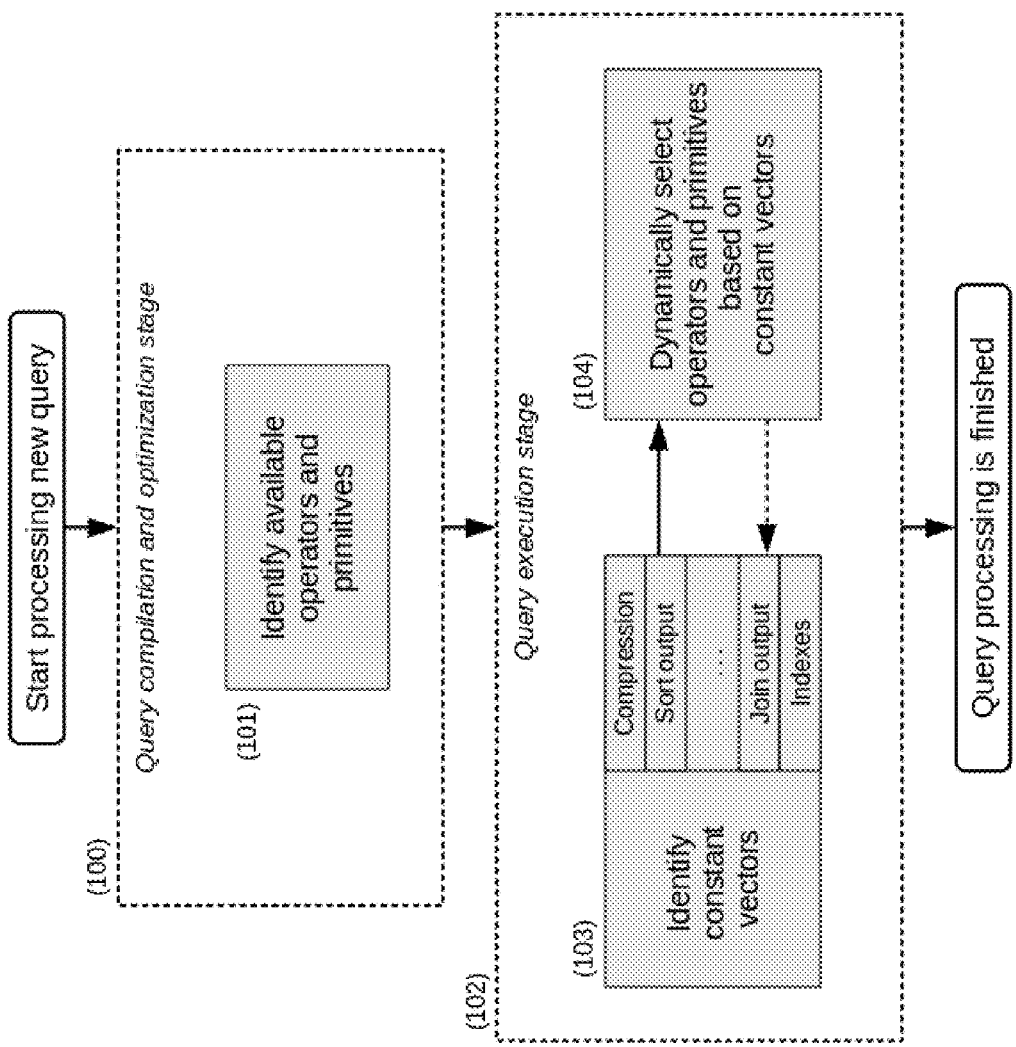
FIG. 4 illustrates a method for constant vector computation.

FIG. 4 illustrates the three components of a constant vector computation system that provides the benefits described above. The method described below may be implemented by the database engine described above or by other processors, pieces of hardware and the like and may be implemented in software, hardware or a combination of hardware and software.

The query processing in a database system starts with query compilation and optimization stage (100), during which the system looks for efficient method of executing a query and creates a query plan. At this stage, a system that employs the constant vector computation method identifies different available primitives and operators that are most efficient depending on the constant-ness of the inputs to the primitives and operators (101).

During a query execution stage (102) when the data is actually being processed, a CVC system identifies and marks constant vectors (103). A vector is considered constant if all the values stored in it, using standard implementation, would have been identical. This process of identifying constant vectors may include analyzing available indexes, information provided by compression, data partitioning, and many other methods, as described below.

The information about constant vectors is used to dynamically choose a most efficient way of executing a given operation (104) based on the identified constant vectors. This process is explained in detail for primitives later in this document. Depending on the type of operation and constant-ness of its input, the resulting output vectors might be again marked as constant.

The constant vector identification process (103) may be performed by constant vector determiners of the database engine that may be implemented in hardware, software or a combination of hardware and software. The identification of constant vectors can occur in multiple different ways and in different areas inside a database system including (but not limited to):

Data-scan of RLE-compressed data: In one example, the data in the store, such as a database, is stored in a compressed form, both to save disk space and to improve I/O performance. One of the popular compression techniques is run length encoding (RLE) that stores each run—that is, set of equal consecutive values of a given attribute—as a pair: value+run length. When the data is RLE-compressed, it is trivial to determine if a given portion of data contains identical values. In particular, during a scan operation in a database system working at a vector granularity, the method can very easily check if a given vector contains all-equal or different values by looking at the types and lengths of the processed RLE runs. This allows determining if a vector is constant in a time proportional to the number of RLE-runs, which can be orders of magnitude smaller than the number of records in a vector. Additionally, it allows omitting the RLE-decompression phase if a vector is determined to be constant.

Data-scan of indexed data: Databases often store and access data using indices, providing a stream of records sorted on the index attributes. Using this access method it is possible to determine if the (subset of) index attributes values are constant for a given range of produced data, e.g. by looking at the first and last value in the produced range.

Data-scan of partitioned data: Databases often allow partitioning data into separate entities. When by-value partitioning methods are used, it is known that all values for the partitioning attribute produced from a single partition are constant allowing creation of a constant vector. Note, that a single data-scan operator might be accessing multiple partitions, so the values in different constant vectors can differ.

Data-scan of data with data-distribution meta-information: Some database systems keep meta information on data stored in a table. A popular method is to keep the minimum and maximum value for a given range of values (for example, for each disk block). If the minimum and maximum values for a given attribute are identical within a given range, then a constant vector for that attribute exists.

Data-scan of arbitrary data: Even for data stored without any known properties, it is possible to efficiently detect if a vector is constant. In the simplest case, it can be achieved by looking at all the values in a given vector provided by the scan operator and checking if they are identical. This process can be optimized in software and hardware, e.g. by
  Avoiding expensive branching instructions by computing the binary AND and binary OR masks for the entire input and checking them at the end (only if they are equal all values are constant).
  Using SIMD instructions available in the modern CPUs to allow further acceleration of the above process.

Result of equality-selection: If a query contains a selection against a constant (e.g. " . . . WHERE X=7"), it is possible to declare the result vector as constant for the attribute participating in the comparison (i.e. "X" in example above). While this optimization is possible on the query optimization/compilation stage, in some cases it can also be introduced in the query execution stage, for example for queries where the constant value is not known at the query optimization/compilation stage (e.g. " . . . WHERE X=(SELECT MAX(value) FROM sometable)").

Result of Cartesian Product and Join operators: Cartesian Product of two relations generates a combination of all tuples from both relations (e.g. for two relations of 20 and 400 records, it will generate 20×400=8000 records). Typically the "build" (usually smaller) relation is materialized in memory or on disk, and then for each record in the "probe" (typically larger) relation a sequence of output records is created. In this output sequence the values of the "probe" attributes are guaranteed to be identical. As a result, if the number of the "build" relation records is large, it is possible to mark the output vectors for the "probe" attributes as constant, which also allows avoiding replication of values in these vectors. Join operators are similar to Cartesian Products, but they have an additional join predicate, which results in only some (possibly empty) subset of the "build" tuples being matched to a given "probe" tuple. Still, for some kinds of joins, the number of "build" tuples matching given "probe" tuple can be large and allow for the creation of constant vectors.

Result of a Sort operator: The output of a Sort operator is sorted based on values and allows easy detection of constant vectors in a manner similar to when scanning indexed data.

The above list is not exhaustive, as databases employ many other operations where similar techniques can be used.

The above methods pass the information that a vector is constant by setting a single boolean "constant" flag for each vector. The database operations can exploit this flag for improved processing speed, as discussed below. As discussed in some examples above, constant vectors can also be used to improve performance by avoiding the materialization of all values inside a vector. This is possible if it is known that all possible consumers of a constant vector will be able to treat it as such. At the same time, it allows the generation of constant vectors with the values internally replicated for operators that can not properly handle constant vectors. This allows incremental incorporation of the constant vector concept inside a database. Note, that constant vectors can be identified (as in examples above) and also propagated by operations based on the fact that their input is already constant.

Figure 7:
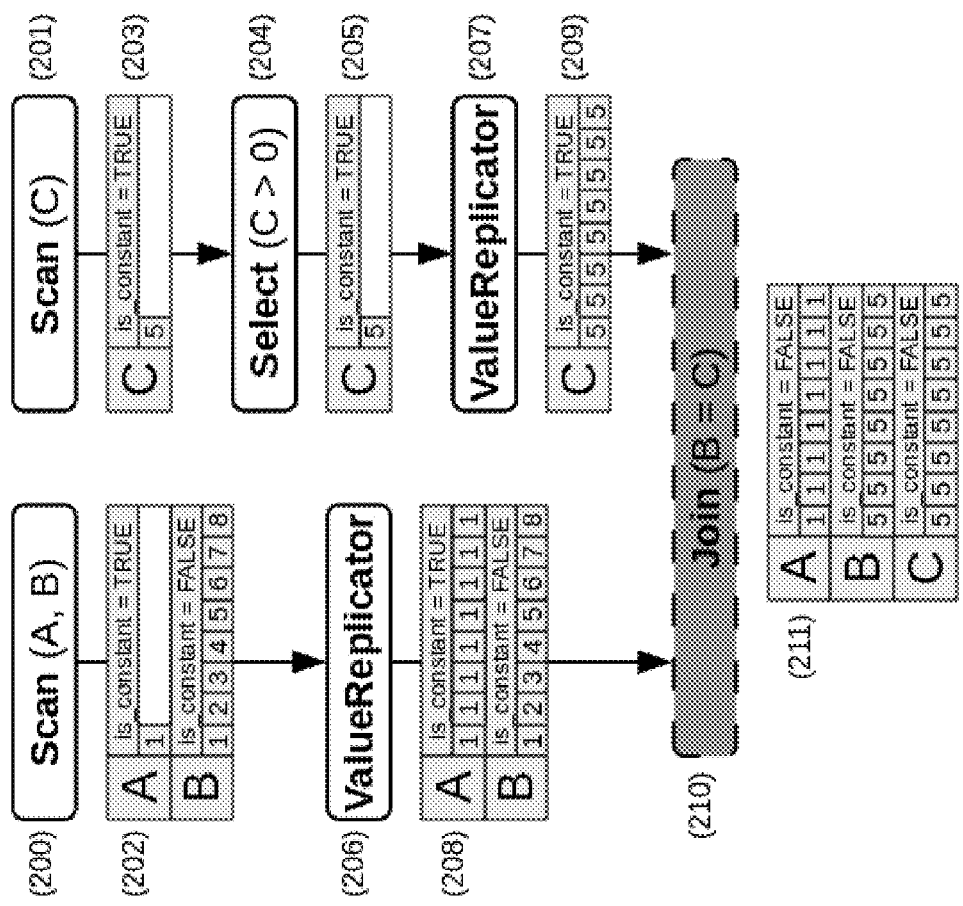
FIG. 7 illustrates the propagation of constant vectors by different operators, as well as a method for incremental introduction of constant vector computation to database kernel.

To illustrate the ideas described above, consider FIG. 7 that presents an example execution of the following query:
  SELECT T1.A, T1.B, T2.C FROM T1, T2 WHERE C>0 AND B=C The Scan operators (200) and (201) utilize a mechanism for detecting constant vectors as described above. In this example, they output 8-value vectors. Scan operator working on table T1 (200) marked a vector of values of attribute A (202) as constant, because in standard implementation it would contain eight copies of value 1. Similarly, vector (203) was marked as constant. This allows Selection operator (204) to process this vector more efficiently, because it has to perform only one comparison instead of eight. If the input of the Selection operator is constant, then its output also has to be constant. Hence, the constant property is being propagated by Selection operator to vector (205) in this example.

In this example, assume that constant vector computations are introduced gradually to the database kernel and Join operator (210) is not yet adapted to work on constant vectors. To solve this problem, the two ValueReplicator operators (206) and (207) are introduced to the query plan. These operators convert constant vectors to standard representation. They are simply filling the vectors with copies of identical values (208) (209), so that they can be processed by a standard Join operator.

Note that, in this example, a performance benefit can be achieved by avoiding materialization of all of the values inside a vector. If the Scan operator (201) produces a constant vector with values not matching the predicate of Selection operator (204), there is no need to replicate these values.

Now, details of how a constant vector property can benefit query execution efficiency is discussed in more detail. For optimal performance, a database system that works on a vector granularity typically includes different variants of operations on data that are chosen depending on whether the arguments are vectors or constants. In the Actian Corporation's Vectorwise system these operations are called primitives as set forth in Zuk09. For example, consider the following query:
  SELECT a/b, a/10, 1/b, 1/10 FROM table For optimal efficiency, the system has to include at least four variants of a division operation: with two vector arguments (a/b), with vector dividend and constant divisor (a/10), with constant dividend and vector divisor (1/b) and with two constant arguments (1/10). Note, that the efficiency of a given operation can vary greatly depending on the "constant-ness" of the input. For example, a division of two non-constant vectors will be slower than a division where the divisor is constant, which in turn will be much slower than a division of 2 constant numbers (which is constant time, hence even hundreds or thousands of times faster). In typical systems, the decision of which operator variant to use is made beforehand based on the query specification and does not change during query execution. However, with the knowledge of constant vectors, the method can select the different variants of the operator/primitive dynamically (104) to take advantage of the constant vector knowledge. This process may be performed by a primitive selector of the database engine and may be implemented in hardware, software or a combination of hardware and software.

Figure 5:
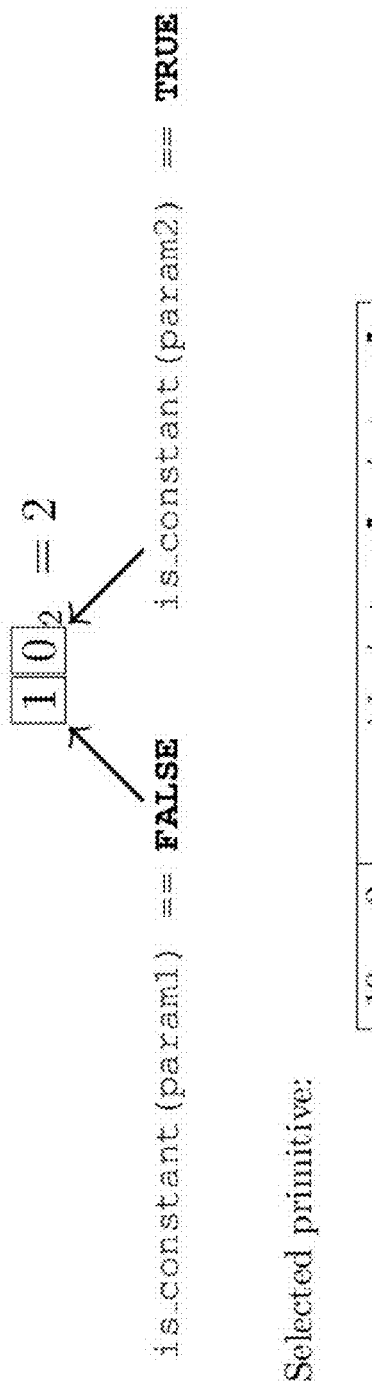
FIG. 5 illustrates an example of choosing best primitive for performing addition of two vectors with signed integer values.

To demonstrate this method (using an example with Actian Corporation Vectorwise-specific naming and functions which are merely illustrative), an example of the addition of signed integers as shown in FIG. 5.

(a) In a query build phase, which is before the system actually starts processing the data, the system finds all of the available primitives for a given operation. As the addition has two arguments, the method identifies four available choices, that is one for each combination of the vector (_col_) and the constant value (_val_) arguments. The system may store the identified primitives in a table for easy access as shown in FIG. 5a.

(b) In the execution phase, for every vector or a collection of vectors that the system has to process, the system checks if those vectors are marked as constant vectors. As a result of that determination, the system/method compute the index in the primitive table and select the best primitive/operator to use. An example of this computation of the index is shown in FIG. 5b for a binary operation. Equivalent solution can be used for operations with any fixed number of parameters (c) Finally, the system/method calls the selected primitive on argument vectors as shown in FIG. 5c. Depending on the type of a primitive, the resulting vector might again be marked as constant.

Performance optimization techniques based on the constant vector property, like the dynamic primitive choice above, can be applied in a wide range of data processing operations. For example:

1. Projection: Take a query with an "A+B" computation. If, in the underlying data, there is a long sequence of A with the same value, long enough to fill an entire vector, or even better, both A and B have that property, a faster implementation will be chosen.

2. Selection: Take a SQL query with a selection "WHEN A<7". If there is a long sequence of A with the same value, making the input vector "constant", the system can compute this selection using just 1 operation for all tuples in this vector.

3. Aggregation: Take a SQL query using "SUM(A) GROUP BY B". In such a query for each record the system performs a: (1) lookup of the position in the accumulated sum dictionary using B, and then (2) update the accumulated value using A. Here, if B has a "constant" property, the system can benefit by performing the lookup only once. Additionally, if A also happens to be constant, the system can perform step (2) in one operation, multiplying the value of A by the number of input tuples and adding it to the accumulated value. Similar optimizations are possible for other aggregate operations, including but not limited to:
  1. COUNT: If A is constant, it is possible to simply increase the count accumulator by the number of the input tuples.
  2. MIN(B) and MAX(B): If both A and B are constant vectors, one can check if the constant value of the B vector is smaller/larger (respectively) than the current accumulated value for A only once.

4. Join: Similar to aggregation, if a join key is constant, the system can perform the lookup in the dictionary for all tuples at once. This can happen e.g. when joining against a dimension table in a star-schema if data in the fact table is fully or partially clustered on the dimension key. Additionally, if the "probe" relation vectors are constant, their values do not need to be replicated for some output tuples as output constant vectors can be created.

5. Other operations: in principle, most forms of operations that need to look at the data can benefit performance-wise if they know that the input is constant. Above examples are provided to demonstrate some of possible solutions, but it is impossible to provide an exhaustive list.

Unlike the prior systems above, the constant vector computation method is well fitted for vector-at-a-time processing and there is no need to change the way the data is being represented. In addition, the integration with a database kernel is straightforward, non-invasive and can be incremental. Furthermore, the complexity of the implementation of the system and method is greatly reduced (compared to the prior systems), because the constant vector computation system and method provides a way to recycle code that is already part of the system, hence the amount of required new code is relatively small. Moreover, the overhead introduced by the constant vector computation method and system for operations on non-constant vectors is unnoticeable.

FIG. 6 is a chart with benchmark results for the constant vector computing method and system. The constant vector computation system and method was tested using proof-of-concept implementation of constant vectors in the Actian VectorWise system in which records of USA domestic flights were stored. The data consisted of a single table with about 125,000,000 rows. For the test, a set of 10 queries (shown as queries 0 to 9 in FIG. 6) that is known as "On-time benchmark" was employed that was previously used to compare performance of different analytical DBMSes (see, for example, Martin Kersten. On-Time Report. http://homepages.cwi.nl/~mk/ontimeReport, December 2010 and Vadim Tkachenko. Analyzing air traffic performance with InfoBright and MonetDB. http://www-.mysqlperformanceblog.com/2009/10/02/analyzing-air-traffic-performance-with-infobright-and-monetdb, October 2009.

The benchmarking results are listed in the middle row of the table in FIG. 6. The constant vector computation system and method reduced execution times of two queries by over 40% and shows significant improvement (10-26%) in four other queries. However, the results were hindered by a number of overheads that would be removed to large extent in full (instead of "field test") implementation. The results for a normal implementation would then approach values listed in the bottom row of the table in FIG. 6.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A system for performing constant vector computation, comprising:
  a computer system having a processor;
  a data access system that accesses a block or a vector of data during each operation; and
  the data access system having an engine executed by the processor that generates queries to run against the data in the data access system, the engine having constant vector detectors that determine when the block of data or the vector of data contains only identical values and the engine, during query execution, selecting vector or block consuming operators that optimize data processing for a particular operation based on whether or not one or more of the inputs to the particular operation are constant vectors.

2. The system of claim 1, wherein the constant vector detector sets a flag indicating that one of the block and the vector contains only identical values.

3. The system of claim 2, wherein the constant vector detector detects a constant vector for a particular block or vector of data based on a run length encoding performed on that particular block or vector of data.

4. The system of claim 2, wherein the constant vector detector detects a constant vector for a particular block or vector of data based on the inspection of the first and last elements in a produced data vector or block based on data accessed using an index structure.

5. The system of claim 2, wherein the constant vector detector detects a constant vector for a particular block or vector of data for the partitioning attribute for partitioned data.

6. The system of claim 2, wherein the constant vector detector detects a constant vector for a particular block or vector of data based on the meta-information on data distribution for the accessed data.

7. The system of claim 6, wherein the constant vector detector detects a constant vector for a particular block or vector of data based on the minimum and maximum values information for sub-sequences of accessed data.

8. The system of claim 2, wherein the constant vector detector detects a constant vector for a particular block or vector of data based on the inspection of all elements in the particular block or vector.

9. The system of claim 2, wherein the constant vector detector detects a constant vector for a particular block or vector of data based on the output properties of one of a sort operation, a join operation, a cartesian-product operation and equality-selection operation for the particular block or vector of data.

10. The system of claim 1 wherein the data access system is a vectorized database system.

11. The system of claim 1, wherein the operator is one of a projection, a selection, a join and an aggregation.

12. The system of claim 1, wherein the engine also identifies one or more primitives to be used by an operator to process one of the block of data and the vector of data.

13. The system of claim 12, wherein the data access system further comprises a table that stores the one or more primitives identified for a given operation depending on the combination of the constant property in the input vectors or blocks.

14. The system of claim 13, wherein a primitive selector selects a primitive from the table by computing an index into the table based on the combination of the constant property in the input vectors or blocks.

15. A method for performing constant vector computation, comprising:
providing a data access system that accesses a block or a vector of data during each operation, the data access system having an engine that generates queries to run against the data in the data access system;
determining, by the engine of the data access system, a constant vector when the block of data or the vector of data contains only identical values;
selecting, for a particular operation during query execution, a vector or block consuming operators based on whether or not one or more of the inputs to the particular operation are constant vectors; and
optimizing the data processing for the particular operation using the vector or block consuming operators.

16. The method of claim 15, wherein determining the constant vector further comprises setting a flag indicating that one of the block and the vector contains only identical values.

17. The method of claim 16, wherein determining the constant vector further comprises detecting a constant vector for a particular block or vector of data based on a run length encoding performed on that particular block or vector of data.

18. The method of claim 16, wherein determining the constant vector further comprises detecting a constant vector for a particular block or vector of data based on the inspection of the first and last elements in a produced data vector or block based on data accessed using an index structure.

19. The method of claim 16, wherein determining the constant vector further comprises detecting a constant vector for a particular block or vector of data for the partitioning attribute for partitioned data.

20. The method of claim 16, wherein determining the constant vector further comprises detecting a constant vector for a particular block or vector of data based on the meta-information on data distribution for the accessed data.

21. The method of claim 20, wherein determining the constant vector further comprises detecting a constant vector for a particular block or vector of data based on the minimum and maximum values information for sub-sequences of accessed data.

22. The method of claim 16, wherein determining the constant vector further comprises detecting a constant vector for a particular block or vector of data based on the inspection of all elements in the particular block or vector.

23. The method of claim 16, wherein determining the constant vector further comprises detecting a constant vector for a particular block or vector of data based on the output properties of one of a sort operation, a join operation, a cartesian-product operation and an equality-selection operation for the particular block or vector of data.

24. The method of claim 15, wherein providing the data access system further comprises providing a vectorized database system.

25. The method of claim 15, wherein the operator is one of a projection, a selection, a join and an aggregation.

26. The method of claim 15 further comprising identifying, by the engine, one or more primitives to be used by an operator to process one of the block of data and the vector of data.

27. The method of claim 26 further comprising storing in a table the one or more primitives identified for a given operation depending on a combination of constant vectors as inputs to the given operation.

28. The method of claim 27 further comprising selecting a primitive from the table by computing an index into the table based on the combination of constant vectors as inputs to the given operation.

29. A method for performing constant vector computation in a data access system that accesses a block or a vector of data during each operation, the data access system having an engine that generates queries to run against the data in the data access system, the method comprising:
determining, by the engine during a query build phase, one or more primitives to be used to process the block of data or the vector of data;
determining, by the engine during an execution phase, a constant vector when the block of data or the vector of data contains only identical values; and
using vector or block consuming operators during query execution to optimize the data processing for a particular operation based on whether or not one or more of the inputs to the particular operation are constant vectors.

30. The method of claim 29, wherein determining the constant vector further comprises setting a flag indicating that one of the block and the vector contains only identical values.

31. The method of claim 30, wherein determining the constant vector further comprises detecting a constant vector for a particular block of vector of data based on a run length encoding performed on that particular block or vector of data.

32. The method of claim 30, wherein the determining the constant vector further comprises detects a constant vector for a particular block or vector of data based on the inspection of the first and last elements in a particular data vector or block based on data accessed using an index structure.

33. The method of claim 30, wherein determining the constant vector further comprises detecting a constant vector for a particular block or vector of data for the partitioning attribute for partitioned data.

34. The method of claim 30, wherein determining the constant vector further comprises detecting a constant vector for a particular block or vector of data based on the meta-information on data distribution for the accessed data.

35. The method of claim 34, wherein determining the constant vector further comprises detecting a constant vector for a particular block or vector of data based on the minimum and maximum values information for sub-sequences of accessed data.

36. The method of claim 30, wherein determining the constant vector further comprises detecting a constant vector for a particular block or vector of data based on the inspection of all elements in the particular block or vector.

37. The method of claim 30, wherein determining the constant vector further comprises detecting a constant vector for a particular block or vector of data based on output properties of one of a sort operation, a join operation, a cartesian-product operation and an equality-selection operation for the particular block or vector of data.

38. The method of claim 29, wherein providing the data access system further comprises providing a vectorized database system.

39. The method of claim 29, wherein the operator is one of a projection, a selection, a join and an aggregation.

40. The method of claim 29 further comprising storing in a table the one or more primitives identified for a given operation depending on a combination of constant vectors as inputs to the given operation.

41. The method of claim 40 further comprising selecting the primitives from the table by computing an index into the table based on the combination of constant vectors as inputs to the given operation.

\* \* \* \* \*